(12) United States Patent
Fenioux

(10) Patent No.: US 8,919,516 B2
(45) Date of Patent: Dec. 30, 2014

(54) AXIALLY ADJUSTABLE WITHOUT PLAY COUPLING BETWEEN FLYWHEEL AND REACTION PLATE

(75) Inventor: Daniel Fenioux, Saleux (FR)

(73) Assignee: Valeo Embrayages, Amiens (FR)

( * ) Notice: Subject to any disclaimer, the term of this patent is extended or adjusted under 35 U.S.C. 154(b) by 665 days.

(21) Appl. No.: 13/125,922

(22) PCT Filed: Oct. 7, 2009

(86) PCT No.: PCT/FR2009/051907
§ 371 (c)(1),
(2), (4) Date: Jul. 15, 2011

(87) PCT Pub. No.: WO2010/052399
PCT Pub. Date: May 14, 2010

(65) Prior Publication Data
US 2011/0259700 A1  Oct. 27, 2011

(30) Foreign Application Priority Data
Nov. 6, 2008 (FR) ...................................... 08 57532

(51) Int. Cl.
*F16D 13/70* (2006.01)
*F16D 21/06* (2006.01)

(52) U.S. Cl.
CPC ............... *F16D 21/06* (2013.01); *F16D 13/70* (2013.01)
USPC ....................................... 192/70.16; 192/48.8

(58) Field of Classification Search
USPC ............ 192/70.16, 48.8, 48.602, 48.607, 112
See application file for complete search history.

(56) References Cited

U.S. PATENT DOCUMENTS 3,791,499 A * 2/1974 Ryan .......................... 192/70.27
5,127,504 A * 7/1992 Beccaris ..................... 192/70.13
6,830,140 B2 * 12/2004 Zink et al. ..................... 192/48.9
8,413,780 B2 * 4/2013 Yildiz et al. .................. 192/48.8
2005/0121281 A1 * 6/2005 Orlamunder et al. ...... 192/48.91
2008/0179157 A1 * 7/2008 Zhou et al. ................... 192/48.1
2011/0079480 A1 * 4/2011 Carey et al. .................. 192/48.1

FOREIGN PATENT DOCUMENTS

| DE | 19818412 | 11/1999 |
|---|---|---|
| EP | 1826427 | 8/2007 |
| EP | 1862687 | 12/2007 |
| EP | 2039952 | 3/2009 |
| FR | 2796682 | 1/2001 |

* cited by examiner

Primary Examiner — Richard M. Lorence
Assistant Examiner — Stacey Fluhart
(74) Attorney, Agent, or Firm — Berenato & White, LLC

(57) ABSTRACT

A system (10) for coupling a drive shaft (12) of a motor vehicle and a coaxial transmission shaft (14A, 14B) is disclosed. The coupling includes a front friction clutch device (22) which comprises a rotary drive assembly (40) comprising a reaction plate (24). The coupling further includes a rear flywheel (20) coaxial to the drive assembly (40), which flywheel is designed to be connected in rotation to the drive shaft (12). The coupling further includes an element (54, 56) for connection in rotation of the flywheel (20) and the drive assembly (40) of the clutch device (22), which includes a first, male element (54) and a second, female element (56) which are designed to be fitted axially in a sliding manner. The elements (54, 56) are provided with fittings which are adjustable axially in a predetermined gap, in that a further element (60) is provided for circumferential clamping of the male element (54) into the female element (56) in a clamped state, the male (54) and female (56) elements being positioned and engaged without circumferential play, and in that the coupling includes additional (66, 68) fasteners for blocking the male (54) and female (56) elements rigidly in their clamped state.

18 Claims, 4 Drawing Sheets

AXIALLY ADJUSTABLE WITHOUT PLAY COUPLING BETWEEN FLYWHEEL AND REACTION PLATE

CROSS-REFERENCE TO RELATED APPLICATIONS AND CLAIM TO PRIORITY

This application relates to International Application No. PCT/FR2009/051907 filed Oct. 7, 2009 and French Patent Application No. 08/57532 filed Nov. 6, 2008, of which the disclosures are incorporated herein by reference and to which priority is claimed.

FIELD OF THE INVENTION

The invention relates to a system for coupling between a drive shaft and a motor vehicle transmission shaft which comprises a friction clutch device and a flywheel.

More particularly, the invention relates to a system for coupling between a motor vehicle drive shaft and a coaxial transmission shaft which comprises:
- a front friction clutch device comprising a rotary drive assembly which comprises at least one reaction plate;
- a rear flywheel coaxial to the drive assembly, which flywheel is designed to be connected in rotation to the drive shaft;
- means for connection in rotation of the flywheel and the drive assembly of the clutch device, which comprise a first, male element and a second, female element which are designed to be fitted axially in a sliding manner in an adjustment gap in an axial position; and
- means for circumferential clamping of the male element in the female element, in a clamped state in which the male and female elements are engaged without circumferential play.

BACKGROUND OF THE INVENTION

A flywheel of this type, which is also known as an "inertia flywheel", can filter the rotational jerking of the crankshaft which forms the drive shaft, whilst imparting the rotational torque of the crankshaft to the reaction plate of the clutch device.

The flywheel is secured to the drive shaft, whereas the clutch device is pre-fitted on the gear box. However, there is generally an axial positioning tolerance between the engine and the gear box. In other words, the axial distance between the engine and the gear box can vary by several millimeters from one vehicle to another, for the same vehicle model.

In order to take into account these axial tolerances, it is known to fit the flywheel so as to be mobile axially relative to the reaction plate of the clutch device.

It is known, for example, in particular from document FR-A-2,816,908, to fit a grooved section of the flywheel in an element for connection with the reaction plate. For this purpose, the connection element comprises a central aperture provided with radial teeth which are received in the axial grooves.

The axial grooves thus permit transmission of the rotational movement and of the torque to the reaction plate, whilst permitting axial displacement of the grooved section of the flywheel along the entire amplitude of the axial tolerance.

However, an arrangement of this type may give rise to knocking noises between the teeth of the connection element and the grooves, in particular during sudden variations of speed.

In order to solve this problem, document WO-A-2007/000.151 proposes an anti-noise device which comprises means for fitting the flywheel, which is pre-stressed circumferentially, by expansion into grooves in the element for connection to the reaction plate, in order to prevent knocking of the teeth of the element against the grooves.

However, the pre-stressing is carried out by circumferential resilient return means forming damping means which always permit pivoting of the connection element in relation to the flywheel. Thus, even if the impacts are deadened, they are always present.

In addition, an anti-noise device of this type is onerous and complex to produce, since it comprises many parts which are added to the flywheel.

In addition, this device does not make it possible to eliminate substantial circumferential play between the teeth and the grooves, which for example is greater than 1 mm.

In addition, the fitting of a device of this type is problematic because the grooved element and the connection element are not easy to see, or cannot be seen at all, by an operator during the assembly. This can give rise to errors which can prolong the duration of the assembly of the coupling system.

SUMMARY OF THE INVENTION

In order to solve these problems in particular, the invention proposes a clutch system of the type previously described, characterised in that the means for connection in rotation are provided with fitting means which are adjustable axially in a predetermined gap, in that means are provided for circumferential clamping of the male element in the female element in a clamped state, the male and female elements being positioned engaged without circumferential play, and in that the coupling system comprises means (66, 68) for blocking the male and female elements rigidly in their clamped state.

According to other characteristics of the invention:
- the male and female elements are arranged on an outer periphery of the coupling system;
- the male element is formed by a lug, and the female element is formed by a clamp, the jaws of which can clamp the lug circumferentially;
- the means for blocking the clamp in its clamped state are formed by a bolt which extends circumferentially;
- the means for clamping the jaws are formed by the bolt;
- the means for clamping the jaws of the clamp are formed by means for resilient return of the jaws in their clamped state;
- the clamp is formed by a part in the shape of a "U", the flexible wings of which, which form jaws, extend axially towards the lug, as far as a free end;
- the bolt comprises a screw and a nut, the head of the screw being able to be screwed by a screwing tool;
- the system comprises means for immobilising the nut of the bolt at least in rotation relative to the clamp;
- the nut is immobilised in rotation by co-operation of complementary forms, between a surface of the clamp and the nut;
- the screw of the bolt passes through the jaws of the clamp;
- the lug comprises a cut-out which is open circumferentially, and is open axially towards the clamp, in order to permit passage of the screw during the axial fitting of the lug in the clamp;
- the screw can abut axially the base of the cut-out, in order to block the axial displacement of the clamp in the direction of fitting, relative to the lug;

the male element is supported by the reaction plate of the drive assembly of the clutch device, and the female element is supported by the flywheel;

the lug extends radially towards the exterior, from a peripheral edge of the reaction plate;

the female element is supported by an intermediate part which is secured to the flywheel, and is interposed axially between the flywheel and the clutch device;

the flywheel comprises an engine torque intake element and an engine torque output element, which are fitted so as to be integral in rotation with circumferential damping, and the male or female element is supported by the engine torque output element; and the clutch device is a multiple disc device which comprises a plurality of pressure plates.

BRIEF DESCRIPTION OF THE DRAWINGS

Other characteristics and advantages of the invention will become apparent from reading the following detailed description, for understanding of which reference will be made to the attached drawings, in which.

DETAILED DESCRIPTION

Hereinafter in the description, elements with functions which are identical, analogous or similar will be designated by the same reference numbers.

In order to facilitate understanding of the description and claims, use will be made, by way of non-limiting example, of axial orientation facing from the back towards the front, which is indicated by the arrow "A" in the figures, and is parallel to the axis of rotation "B" of the coupling system 10, and a radial orientation which faces from the interior to the exterior, from the axis of rotation "B" of the coupling system 10. Use will also be made of circumferential rotation which faces at right-angles to the axis "B", and at right—angles to the radial direction.

Figure 1:
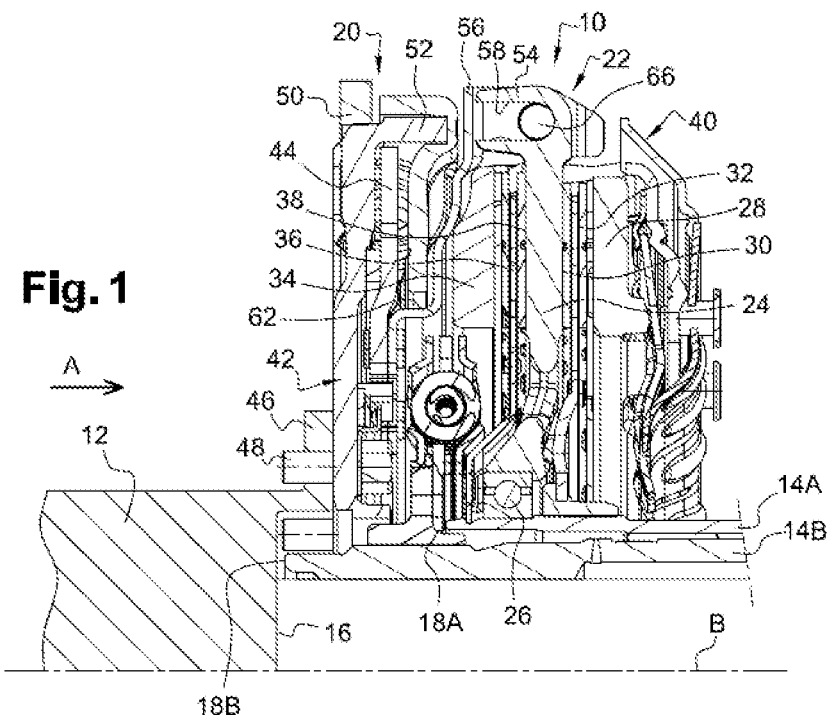
FIG. 1 is a half view in axial cross-section according to the cross-sectional plane 1-1 in FIG. 2, which represents a coupling system comprising a friction clutch device and a double damping flywheel which are assembled by assembly means produced according to the teaching of the invention.

FIG. 1 shows an assembled coupling system 10, which is designed to couple a drive shaft arranged axially towards the rear, and a free front end section 12 of which is represented on the left in FIG. 1, with at least one driven transmission shaft 14 which is arranged axially at the front.

The free front end section 12 of the drive shaft and the corresponding rear end section 14 of the transmission shaft are both cantilevered.

Hereinafter in the description and in the claims, for the sake of simplification, the terms "free front end section 12 of the drive shaft" and "free rear end section 14 of the transmission shaft" will be designated respectively by "the drive shaft 12" and "the transmission shaft 14", unless it is specified that the shaft is being considered as a whole.

The drive shaft 12 rotates around an axis of rotation "B", and is rotated by an engine (not shown) of the motor vehicle. This is for example a crankshaft of a combustion engine.

The coupling system 10 shown in FIG. 1 comprises two transmission shafts, the free rear end sections 14A, 14B of which are shown.

The transmission shafts 14A, 14B are fitted such as to rotate substantially coaxially to the drive shaft 12. The first transmission shaft 14A forms an axial tube, inside which the second transmission shaft 14B is arranged. Each of the transmission shafts 14A, 14B can rotate independently from the other.

The free from end 16 of the drive shaft 12 is arranged axially to the rear, and spaced from the free rear ends 18A, 18B of the transmission shafts 14A, 14B.

The transmission shafts 14A, 14B are connected to a rear gear box (not shown). More particularly, the first transmission shaft 14A corresponds to certain gear ratios of the gear box, for example the odd gear ratios, whereas the second transmission shaft 14B corresponds to the other gear ratios, for example the even gear ratios.

Figure 3:
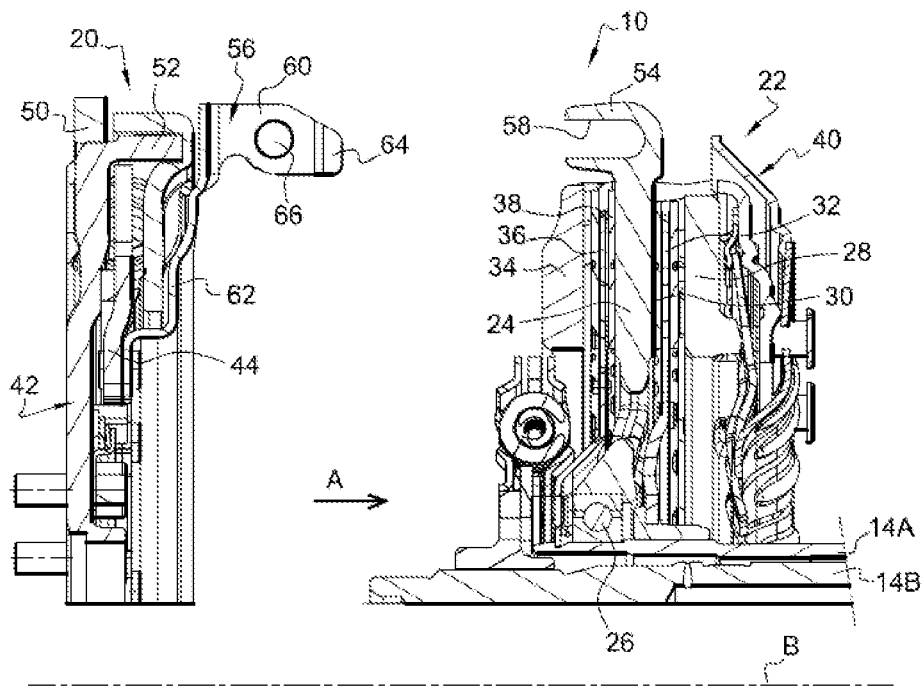
FIG. 3 is a view similar to the one in FIG. 1, which represents the coupling system before the assembly of the flywheel on the friction clutch device.
Figure 4:
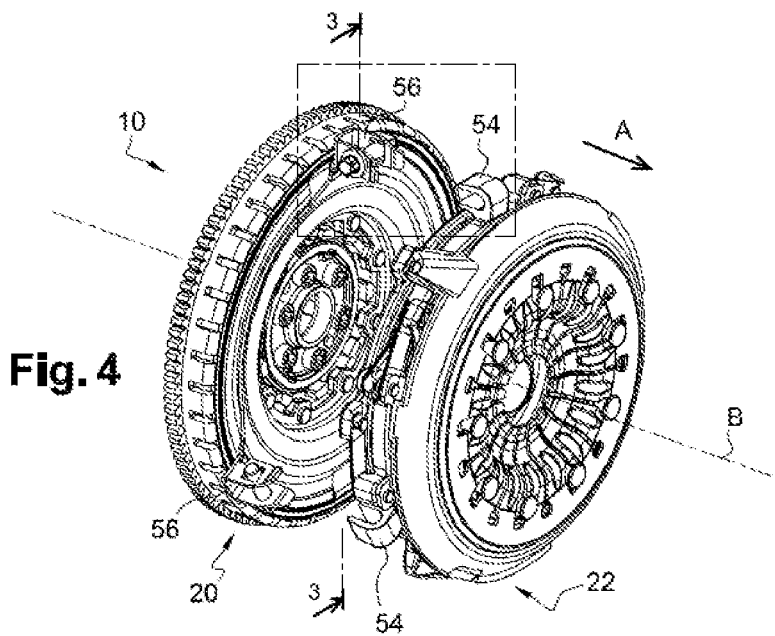
FIG. 4 is a view similar to the one in FIG. 2, which represents the coupling system before the assembly of the flywheel on the friction clutch device.

The coupling system 10 comprises a rear device for filtering of the rotational jerking of the drive shaft 12, which is formed by a flywheel 20 known as a "double damping flywheel", and it comprises a front friction clutch device 22. These two devices can be seen more clearly when they are not assembled, as shown in FIGS. 3 and 4. They are designed to be assembled axially to one another in order to form the coupling system 10, as will be described hereinafter.

The friction clutch device 22 is in this case of the multiple disc type. It comprises first means for temporary coupling of the first transmission shaft 14A to the drive shaft 12 which are supported only by the first transmission shaft 14A.

In a known manner, the friction clutch device 22 comprises a circular radial reaction plate 24, which is fitted such as to rotate freely around the axis of rotation "B". The reaction plate 24 is supported by the first transmission shaft 14A, by means of a ball bearing 26.

The reaction plate 24 is more particularly fitted fixed axially relative to the first transmission shaft 14A. For this purpose, the inner ring of the ball bearing 26 is blocked axially in both directions, and the outer ring of the ball bearing 26 is fitted clamped on the reaction plate 24.

In addition, the reaction plate 24 is integral in rotation with the drive shaft 12 by means of the flywheel 20, which is arranged at a rear end of the friction clutch device 22, and will be described in greater detail hereinafter.

The first coupling means also comprise a first front annular pressure plate 28, which is fitted integrally in rotation with the reaction plate 24 round the axis of rotation "B", and is fitted such as to slide axially relative to the reaction plate 24. The front pressure plate 28 is more particularly arranged axially opposite a front surface 30 of the reaction plate 24.

A first front coaxial friction disc 32 is interposed axially between the reaction plate 24 and the front pressure plate 28. The front friction disc 32 comprises an annular friction lining on its two surfaces.

The front friction disc 32 is fitted integrally in rotation with the first transmission shaft 14A, and is fitted such as to slide axially on the first transmission shaft 14A.

The front friction disc 32 is designed to be clamped against the front surface 30 of the reaction plate 24 by the front pressure plate 28, in order to couple the first transmission shaft 14A to the drive shaft 12 temporarily, i.e. so that it can be disengaged.

The coupling system 10 also comprises second means for temporary coupling of the second transmission shaft 14B to the drive shaft 12, which are arranged symmetrically to the first coupling means relative to the reaction plate 24, and are supported by the transmission shafts 14A, 14B.

The second coupling means thus comprises a second rear pressure plate 34 and a rear friction disc 36 for temporary coupling of the second transmission shaft 14B to the drive shaft 12. The functions respectively of the rear pressure plate 34 of the rear friction disc 36 are similar to those of the front pressure plate 28 of the front friction disc 32.

The rear pressure plate 34 is fitted axially opposite the rear surface 38 of the reaction plate 24. The rear pressure plate 34 is integral in rotation with the reaction plate 24, and slides axially relative to the reaction plate 24.

The rear friction disc 36 is fitted integrally in rotation with the second transmission shaft 14B, and is fitted such as to slide axially on the second transmission shaft 14B.

Thus, the rear friction disc 36 is designed to be clamped against the rear surface 38 of the reaction plate 24 by the rear pressure plate 34, in order to couple the second transmission shaft 14B temporarily to the drive shaft 12.

The assembly formed by the pressure plates 28, 34 and by the reaction plate 24 is thus fitted integrally in rotation with the drive shaft 12. It therefore forms a rotary drive assembly 40, whereas the friction discs 32, 36 form rotary driven assemblies together with their associated transmission shaft 14A, 14B.

The flywheel 20 will now be described in detail. The flywheel 20 is in this case a double damping flywheel which comprises an engine torque rear intake element 42 and an engine torque front output element 44.

The torque intake element 42 is formed by an annular rear primary flywheel 42, which extends radially coaxially to the axis of rotation "B". The torque intake element 42 is supported by the drive shaft 12, and is connected in rotation to the drive shaft 12 without radial play, without angular clearance around the axis "B", and without axial play.

For this purpose, a front end securing flange 46 which is formed at the front free end 16 of the drive shaft 12 is secured against a rear end surface of the primary flywheel 42 of the torque intake element 42, by means of a plurality of screws 48, a single one of which is shown in FIG. 1. The torque intake element 42 is thus integral with the displacements of the free end 16 of the drive shaft 12 in all directions, and in particular axially.

The torque intake element 42 also supports a toothed starter ring 50, which is arranged around an outer peripheral axial surface of the primary flywheel 42 of the torque intake element 42.

The torque intake element 42 comprises on its outer periphery a skirt 52 which extends axially forwards from an outer peripheral edge of the primary flywheel 42.

The torque output element 44 is formed by a secondary element 44 which forms a ring which extends radially around the axis of rotation "B". The secondary element 44 is more particularly arranged radially at the front of, and spaced from, a front radial surface of the primary flywheel 42, inside a cavity in the primary flywheel 42 which is delimited radially by the skirt 52.

The secondary element 44 is connected in rotation to the torque intake element 42, with damped angular clearance.

For this purpose, at least one resilient unit (not shown) with circumferential action is arranged in a peripheral receptacle in the primary flywheel 42.

A damping flywheel 20 of this type is already known in the prior art, and will not be described in greater detail hereinafter.

The flywheel 20 is designed to rotate the drive assembly 40 of the clutch device 22. For this purpose, the coupling system 10 also comprises means for connection in rotation of the flywheel 20 and of the drive assembly 40 of the clutch device 22, with axial adjustment of the position between the flywheel 20 and the clutch device 22, in order to eliminate the axial tolerances.

The connection means comprise at least a first, male element 54 and at least a second, associated female element 56, which are designed to be fitted together axially.

In this case, the male element 54 is secured relative to the reaction plate 24, whereas the female element 56 is secured relative to the element 44 of the flywheel 20. However, the male element 54 and the female element 56 can be slid axially relative to one another in an adjustment gap in which they maintain the function of connection in rotation of the flywheel 20 relative to the clutch device 22, in order to take into account the axial position tolerance of the flywheel 20 relative to the clutch device 22. The position of the means 54, 56 for connection in rotation can therefore be adjusted axially.

Figure 7:
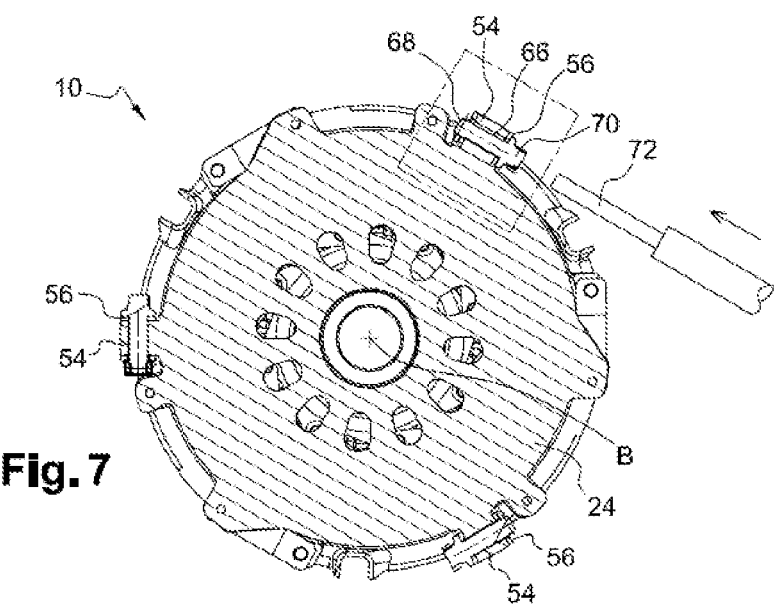
FIG. 7 is a view in radial cross-section in the thickness of the reaction plate of the assembled coupling system.
Figure 8:
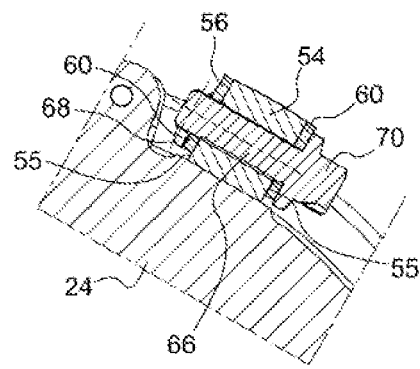
FIG. 8 is a detailed view on an enlarged scale of FIG. 7, which represents the assembly means.
Figure 9:
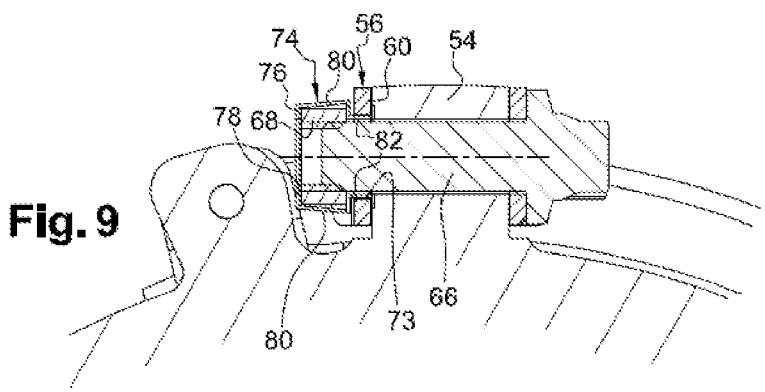
FIG. 9 is a detailed view on an enlarged scale of FIG. 8, which represents the means for immobilisation of the nut relative to the clamp.

As shown in FIG. 7, the connection means in this case comprise three male elements 54, which are associated with three female elements 56. These three pairs of associated elements 54, 56 are distributed regularly, i.e. at 120°, around the axis of rotation "B". Since these three pairs of elements 54, 56 are identical in their structure, their arrangement and their functions, a single pair of elements 54, 56 will be described hereinafter, the description being applicable to the other pairs of elements 54, 56.

In the example represented in the figures, the male element 56 is supported by the drive assembly 40 of the clutch device 22, whereas the female element 56 is supported by the element 44 of the flywheel 20.

Figure 2:
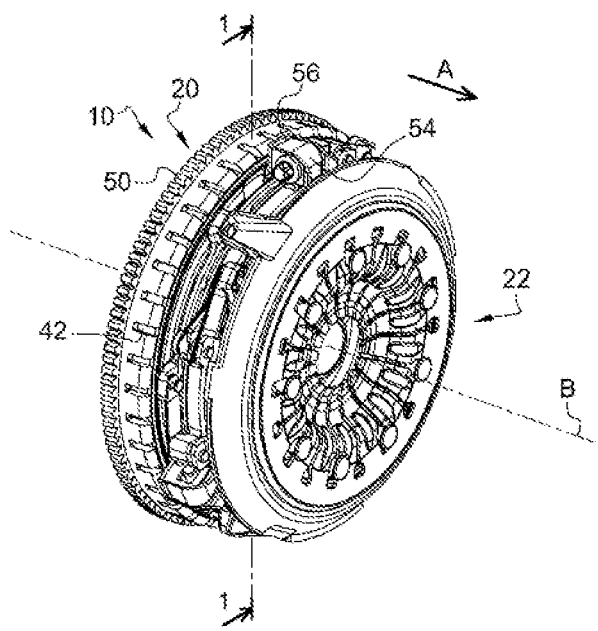
FIG. 2 is a view in perspective which represents the coupling system in FIG. 1.

The male element 54 and the female element 56 are arranged on an outer periphery of the coupling system 10, such as to be visible when the coupling system 10 is assembled, as illustrated in FIG. 2.

More particularly, the male element 54 is formed by a lug 54 which extends projecting radially to the exterior from an outer peripheral edge of the reaction plate 24. The lug 54 is delimited circumferentially by two lateral axial surfaces 55 which are parallel to one another.

The lug 54 is advantageously produced integrally with the reaction plate 24.

Through the lug 54 there passes tangentially a cut-out 58 which is open axially at the rear. The cut-out 58 is delimited by an inner surface and an outer surface, and it is delimited axially at the front by a base.

The female element 56 is formed by a clamp 56 comprising two jaws 60 which can be clamped, i.e. brought closer circumferentially towards one another. More specifically, the clamp 56 is formed by a part in the shape of a "U" comprising a circumferential radial core 59. Parallel radial wings 60 form jaws 60 which extend axially forwards from each circumferential edge of the core 59, as far as a free end. The wings 60 are more particularly resiliently flexible in order to allow them to be clamped circumferentially.

The core 59 of the clamp 56 has a circumferential width which is substantially equal to that of the lug 54.

The clamp 56 is supported by an intermediate part 62 which is secured to the element 44 of the flywheel 20, and is interposed axially between the flywheel 20 and the clutch device 22.

The intermediate part 62 is more particularly formed by an annular plate which is coaxial to the axis "B", and has great rigidity in torsion around the said axis "B". The intermediate part 62 is secured by its inner periphery against the front surface of the element 44, by any suitable securing means, for example by riveting, welding or gluing.

The core 59 of the clamp 56 extends projecting radially from the outer peripheral edge of the intermediate part 62, such as to be arranged opposite the lug 54.

The clamp 56 is advantageously produced integrally with the intermediate part 62, for example by cutting and bending the plate which constitutes the intermediate part 62.

When the lug 54 is fitted axially between the jaws 60 of the clamp 56, the lug 54 and the clamp 56 are engaged circumferentially in both directions in order to connect in rotation the element 44 of the flywheel 20 and the drive assembly 40 of the clutch device 22.

The axial length of the jaws 60 is sufficient to make it possible to regulate the axial position of the lug 54 relative to the clamp 56, which continues to be engaged circumferentially. In other words, it is possible to make the lug 54 slide axially in the clamp 56 along an adjustment gap which is delimited by a front end axial position, in which the lug 54 is engaged between the free end sections 64 of the jaws 60, and a rear end axial position in which the lug 54 abuts the core 59 of the clamp 56, the function of connection in rotation around the axis "B" being assured along the entire adjustment gap.

The jaws 60 of the clamp 56 can clamp or grip the lug 54 circumferentially, thus forming means for circumferential clamping of the male element in the female element in a clamped state in which the male and female elements are engaged without circumferential play, in order to prevent noises of knocking of the lug 54 against the jaws 60.

The means for clamping of the jaws 60 of the clamp 56 are formed for example by means for resilient return of the jaws 60 to their clamped state. Since in this case the jaws 60 are formed by flexible and resiliently deformable wings of the clamp 56, it is the resilience itself of the wings which forms the resilient return means.

Figure 5:
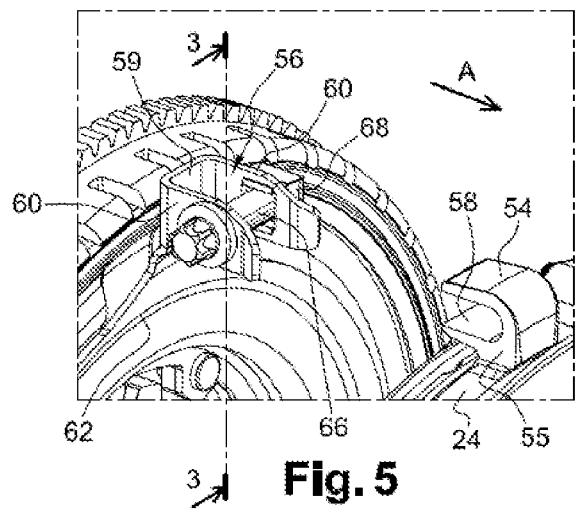
FIG. 5 is a detailed view on an enlarged scale of FIG. 4, which resents means for assembly of the flywheel on the friction clutch device.
Figure 6:
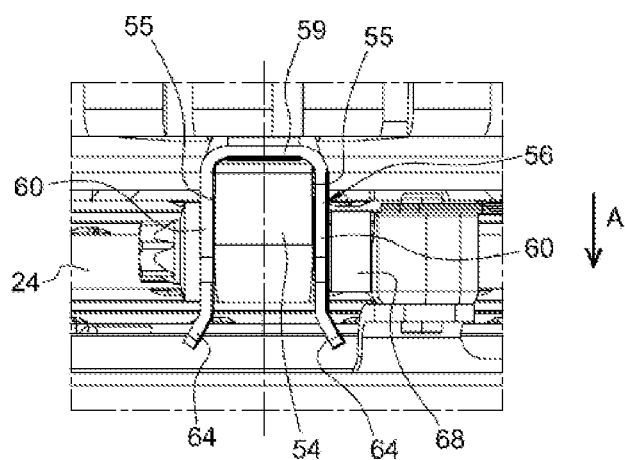
FIG. 6 is a view from above which represents the assembly means after the assembly of the flywheel on the clutch device.

As shown more clearly in FIGS. 5 and 6, in order to facilitate the fitting of the lug 54 in the clamp 56, the free front end 64 of the jaws 60 is curved in a circumferential direction opposite the other jaw 60. The free ends 64 of the jaws 60 are thus spaced from one another, such that the two curved ends 64 form a funnel in which the lug 54 can be guided during the axial fitting.

In addition, the curved ends 64 also act as a guide ramp to control automatically the spacing of the jaws 60 by contact with the lug 54 during the axial fitting.

The coupling system 10 also comprises means for blocking the female element 56 rigidly in its clamped state relative to the male element 54.

As shown in the figures, the means for blocking the clamp 56 in its clamped state are formed by a bolt 66, 68 which extends circumferentially.

The bolt 66, 68 comprises a screw 66 and a nut 68.

The screw 66 comprises a threaded rod which extends circumferentially, and comprises an end head 70 with an indentation, which in this case is in the form of a star. The screw head 70 can thus be screwed by a screwing tool 72, as shown in FIG. 7. The screwing is facilitated in particular by the fact that the lug 54 and the clamp 56 are arranged on the outer periphery of the coupling system 10, thus permitting easy access to the screw head 70.

The screw 66 of the bolt passes through the jaws 60 of the clamp 56 at right-angles, from one side to another. For this purpose, each jaw 60 comprises an aperture 73 for passage of the screw 66, such that the screw head 70 is supported against an outer surface of one jaw 60, whereas a free end section of the threaded rod projects relative to the outer surface of the other jaw 60. In this case, the term "outer surface" should be understood as "surface of a jaw facing in a direction opposite the other jaw 60".

The section of the screw 66 which is contained between the two jaws 60 is designed to be received in the cut-out 58 in the lug 54, in particular in order to permit the axial sliding of the flywheel 20 relative to the clutch device 22, but also in order to immobilise the flywheel 20 radially relative to the clutch device 22. The axial base of the cut-out 58 is also designed to form a stop which co-operates with the screw 66, in order to block the axial displacement of the flywheel 20 in the direction of fitting relative to the clutch device 22.

The nut 68 is designed to be screwed around the projecting free end of the threaded rod, such that the jaws 60 are blocked between the screw head 70 and the nut 68 in their circumferentially clamped state.

In order to make it possible to screw the screw 66 into the nut 68, the nut 68 is immobilised in rotation relative to the associated jaw 60 of the clamp 56.

The out 68 is immobilised at least in rotation by co-operation of complementary forms between a surface of the clamp 56 and the nut 68.

For this purpose, the nut 68 has a form which is not of revolution around the axis of the screw 66. The nut 68 has a square profile for example.

The nut 68 is received in a cage 74 which is secured against the outer surface of the jaw 60, such that the nut 68 is trapped between the cage 74 and the jaw 60. The nut 68 is thus secured axially against the jaw 60.

The cage 74 is formed by a resiliently deformable plate part, with an axial radial base 76 with a dimensions and form complementary to that of the nut 68. The base 76 is arranged circumferentially opposite, and spaced from, the outer surface of the associated jaw 60, such that the nut 68 is received between the base 76 and the said outer surface.

The base 76 has a hole 78 in order to permit the passage of the threaded rod of the screw 66.

The base 76 is flanked by two opposite lateral walls 80, which in this case are interior and exterior, and extend circumferentially in the direction of the jaw 60.

The free end of each lateral wall 80 comprises a hook 82 which is designed to hook the interior of an edge of the aperture 73 of passage of the jaw 60. The aperture of passage 73 has a non-circular profile, such as to block the rotation of the cage 74 relative to the jaw 60.

The hooking of the hooks 82 is carried out by resilient flexure deformation of the lateral walls 80 of the cage 74, thus making it possible to draw the hooks 82 together in order to introduce them in a circumferential direction in the passage aperture 73. The lateral walls 80 are then returned resiliently to their non-stressed state, such as to give rise to hooking of the hooks 82.

The nut 68 is thus immobilised axially between the base 76 of the cage and the jaw 60 and radially between the lateral walls 80. In addition, each lateral wall 80 is flat, such as to co-operate with a peripheral face of the nut 68, in order to immobilise the nut 68 in rotation relative to the clamp 56.

According to a variant not shown of the invention, the nut 68 can also be secured to the associated jaw 60 of the clamp 56 by other means, for example by crimping or by welding.

Advantageously, the nut 68 comprises means for preventing untimely unscrewing of the screw 66. The nut 68 is for example a locknut such as a slotted nut.

As a variant, an adhesive, which is also known as a "thread brake" can be disposed on the threaded rod of the screw 66 in order to prevent the unscrewing of the nut 68 by gluing on the screw 66.

During the assembly of the coupling system 10, the screw 66 and its nut 68 are pre-fitted on the associated clamp 56 in a non-clamped position, in order to permit sufficient spacing of the jaws 60 for axial fitting on the associated lug 54.

Then the clutch device 22 is arranged axially opposite the flywheel 20, such that each lug 54 coincides with the associated clamp 56.

The clutch device 22 is then slid axially towards the flywheel 20, such that each lug 54 is fitted axially between the jaws 60 of the associated clamp 56.

The screw 66 is received in the cut-out 58 in the lug 54. The screw 66 can abut axially the base of the cut-out 58, in order to block the axial displacement of the clamp in the direction of fitting, relative to the lug 54.

In addition, the flywheel 20 is immobilised radially in all directions relative to the clutch device 22 by the contact between the screws 66 and the inner and outer axial surfaces of the cut-outs 58 in the lugs 54.

Then, during the installation of the coupling system 10 in the engine compartment of the associated vehicle, the flywheel 20 can be slid axially rearwards relative to the clutch device 22, in order to allow it to be secured to the drive shaft 12. This sliding is carried out in the adjustment gap, so that the lug 54 is always engaged between the jaws 60 of the clamp 56 in its new axial position.

The cut-out 58 in the lug 54 and the jaws 60 of the clamp 56 have axial lengths which are sufficient to permit this sliding, whilst ensuring that the lug 54 remains fitted or engaged between the jaws 60 of the clamp 56.

The screwing tool 72 is then engaged on the screw head 70, in order to permit the blocking or clamping of the jaws 60 of each clamp 56 in a circumferentially clamped state. The lug 54 is then immobilised axially relative to the clamp 56.

All these operations are facilitated by the fact that the operator sees the connection means 54, 56 clearly, even after assembly.

In addition, the connection means comprising a clamp 56 of this type make it possible to eliminate simply and efficiently substantial circumferential play, for example in the order of several millimeters.

According to a variant not shown of the invention, in their state of rest, the jaws of the clamp are open sufficiently to receive the lug with circumferential play. In this case, the jaws of the clamp are clamped around the lug by the screwing of the screw in the nut.

The invention has been described for a coupling system 10 equipped with a double damping flywheel 20. It will be understood that it is also applicable to a simple inertia flywheel or to a so-called "flexible" inertia flywheel. In this case, the torque intake element and the torque output element are formed by a single annular part which forms the flywheel.

The invention has been described for a multiple-disc friction clutch device 22 comprising a single reaction plate and two pressure plates. It will be understood that the invention is also applicable to a single or multiple-disc clutch device wherein the drive assembly comprises as many reaction plates as pressure plates.

The invention claimed is:

1. A coupling system (10) for coupling between a drive shaft (12) of a motor vehicle and a coaxial transmission shaft (14A, 14B), the coupling system comprising:
   a front friction clutch device (22) comprising a rotary drive assembly (40) which comprises at least one reaction plate (24);
   a rear flywheel (20) coaxial to the drive assembly (40), the rear flywheel is designed to be connected in rotation to the drive shaft (12);
   first means (54, 56) for connection in rotation of the flywheel (20) and the drive assembly (40) of the clutch device (22), the first means (54, 56) comprising a male element (54) and a female element (56) designed to be fitted axially in a sliding manner;
   second means (60) for circumferential clamping of the male element (54) in the female element (56) in a clamped state; and
   third means (66, 68) for blocking the male element (54) and female element (56) rigidly in the clamped state thereof;
   the male element (54) of the first means (54, 56) being axially adjustable relative to the female element (56) in a predetermined gap;
   the male (54) and female (56) elements being positioned engaged without circumferential play;
   the male element (54) comprising a cut-out (58) open towards the female element (56) in order to permit passage of the third means (66, 68) during the axial fitting of the male element (54) in the female element (56);
   the cut-out (58) in the male element (54) and the female element (56) having axial lengths sufficient to permit axial adjustment of the male element (54) relative to the female element (56) and ensuring that the male element (54) remains engaged with the female element (56).

2. The coupling system (10) according to claim 1, wherein the male (54) and female (56) elements are arranged on an outer periphery of the coupling system (10).

3. The coupling system (10) according to claim 2, wherein the male element is formed by a lug (54), and wherein the female element is formed by a clamp (56) comprising two jaws (60), the jaws (60) of the clamp (56) are provided to clamp the lug (54) circumferentially.

4. The coupling system (10) according to claim 3, wherein the third means for blocking the clamp (56) in its clamped state are formed by a bolt (66, 68) which extends circumferentially.

5. The coupling system (10) according to claim 4, wherein the bolt comprises a screw (66) with a head (70) and a nut (68), the head (70) of the screw (66) being able to be screwed by a screwing tool (72).

6. The coupling system (10) according to claim 5, further comprising means (74) for immobilizing the nut (68) of the bolt at least in rotation relative to the clamp (56).

7. The coupling system (10) according to claim 6, wherein the nut (68) is immobilized in rotation by co-operation of complementary forms, between a surface (80) of the clamp (56) and the nut (68).

8. The coupling system (10) according to claim 5, wherein the screw (66) of the bolt passes through the jaws (60) of the clamp (56).

9. The coupling system (10) according to claim 8, wherein the lug (54) is disposed between the jaws (60) of the clamp (56) and comprises the cut-out (58); the cut-out (58) is open circumferentially and axially towards the clamp (56) in order to permit passage of the screw (66) during the axial fitting of the lug (54) in the clamp (56); the cut-out (58) in the lug (54) and the jaws (60) of the clamp (56) have axial lengths sufficient to permit axial adjustment of the lug (54) relative to the clamp (56) and ensuring that the lug (54) remains fitted between the jaws (60) of the clamp (56).

10. The coupling system (10) according to claim 9, wherein the screw (66) can abut axially a base of the cut-out (58), in order to block the axial displacement of the clamp (56) in the direction of fitting, relative to the lug (54).

11. The coupling system (10) according to claim 3, wherein the third means for blocking the male (54) and female (56) elements are formed by the bolt (66, 68) provided to clamp the jaws (60).

12. The coupling system (10) according to claim 3, wherein the third means for blocking the male (54) and female (56) elements are formed by means for resilient return of the jaws (60) in the clamped state thereof.

13. The coupling system (10) according to claim 3, wherein the clamp (56) is formed by a part in the shape of a "U", flexible wings of which form the jaws (60) of the clamp (56) and extend axially towards the lug (54), as far as a free end (64) of the jaws (60).

14. The coupling system (10) according to claim 1, wherein the clutch device (22) is a multiple disc device which comprises a plurality of pressure plates (28, 34).

15. A coupling system (10) for coupling between a drive shaft (12) of a motor vehicle and a coaxial transmission shaft (14A, 14B), the coupling system comprising:
   a front friction clutch device (22) comprising a rotary drive assembly (40) which comprises at least one reaction plate (24);
   a rear flywheel (20) coaxial to the drive assembly (40), the rear flywheel being designed to be connected in rotation to the drive shaft (12);
   first means (54, 56) for connection in rotation of the rear flywheel (20) and the drive assembly (40) of the clutch device (22), the first means (54, 56) comprising a male element (54) and a female element (56) designed to be fitted axially in a sliding manner;
   second means (60) for circumferential clamping of the male element (54) in the female element (56) in a clamped state; and
   third means (66, 68) for blocking the male element (54) and female element (56) rigidly in the clamped state thereof;
   the male element (54) of the first means (54, 56) being axially adjustable relative to the female element (56) in a predetermined gap;
   the male (54) and female (56) elements being positioned engaged without circumferential play;
   the male element (54) supported by the at least one reaction plate (24) of the drive assembly (40) of the clutch device (22), and the female element (56) supported by the rear flywheel (20);
   the male element (54) comprising a cut-out (58) open towards the female element (56) in order to permit passage of the third means (66, 68) during the axial fitting of the male element (54) in the female element (56);
   the cut-out (58) in the male element (54) and the female element (56) having axial lengths sufficient to permit axial adjustment of the male element (54) relative to the female element (56) and ensuring that the male element (54) remains engaged with the female element (56).

16. The coupling system (10) according to claim 15, wherein the male element (54) extends radially towards the exterior from a peripheral edge of the at least one reaction plate (24).

17. The coupling system (10) according to claim 16, wherein the female element (56) is supported by an intermediate part (62) which is secured to the rear flywheel (20), and is interposed axially between the rear flywheel (20) and the clutch device (22).

18. A coupling system (10) for coupling between a drive shaft (12) of a motor vehicle and a coaxial transmission shaft (14A, 14B), the coupling system comprising:
   a front friction clutch device (22) comprising a rotary drive assembly (40) which comprises at least one reaction plate (24);
   a rear flywheel (20) coaxial to the drive assembly (40), the rear flywheel being designed to be connected in rotation to the drive shaft (12);
   first means (54, 56) for connection in rotation of the rear flywheel (20) and the drive assembly (40) of the clutch device (22), the first means (54, 56) comprising a male element (54) and a female element (56) designed to be fitted axially in a sliding manner;
   second means (60) for circumferential clamping of the male element (54) in the female element (56) in a clamped state; and
   third means (66, 68) for blocking the male element (54) and female element (56) rigidly in the clamped state thereof;
   the male element (54) of the first means (54, 56) being axially adjustable relative to the female element (56) in a predetermined gap;
   the male (54) and female (56) elements being positioned engaged without circumferential play; and
   the rear flywheel (20) comprises an engine torque intake element (42) and an engine torque output element (44), which are fitted so as to be integral in rotation with circumferential damping, and in that the male or female element (56) is supported by the engine torque output element (44);
   the male element (54) comprising a cut-out (58) open towards the female element (56) in order to permit passage of the third means (66, 68) during the axial fitting of the male element (54) in the female element (56);
   the cut-out (58) in the male element (54) and the female element (56) having axial lengths sufficient to permit axial adjustment of the male element (54) relative to the female element (56) and ensuring that the male element (54) remains engaged with the female element (56).

* * * * *